United States Patent
Osman (10) Patent No.: US 10,156,207 B2
(45) Date of Patent: Dec. 18, 2018

(54) ULTRA HUSH EXHAUST SYSTEM (UHES)

(71) Applicant: Medhat Osman, Gilbert, AZ (US)

(72) Inventor: Medhat Osman, Gilbert, AZ (US)

(*) Notice: Subject to any disclaimer, the term of this patent is extended or adjusted under 35 U.S.C. 154(b) by 578 days.

(21) Appl. No.: 14/988,694

(22) Filed: Jan. 5, 2016

(65) Prior Publication Data

US 2017/0191447 A1    Jul. 6, 2017

(51) Int. Cl.
| | |
|---|---|
| F02K 1/82 | (2006.01) |
| F02K 1/34 | (2006.01) |
| F02K 1/36 | (2006.01) |
| F02K 1/38 | (2006.01) |
| F02K 1/60 | (2006.01) |

(52) U.S. Cl.
CPC ............ *F02K 1/82* (2013.01); *F02K 1/34* (2013.01); *F02K 1/36* (2013.01); *F02K 1/383* (2013.01); *F02K 1/60* (2013.01); *F02K 1/827* (2013.01); *F05D 2220/323* (2013.01); *F05D 2240/128* (2013.01); *F05D 2250/283* (2013.01)

(58) Field of Classification Search
CPC ... F02K 1/34; F02K 1/38; F02K 1/383; F02K 1/36; F02K 1/60; F02K 1/763; F02K 1/827; F02K 1/82; F05D 2250/283; F05D 2240/128
See application file for complete search history.

(56) References Cited

U.S. PATENT DOCUMENTS

| | | | | |
|---|---|---|---|---|
| 3,084,507 A | * | 4/1963 | Kleinhans et al. ... | B64C 25/423 239/265.13 |
| 3,262,264 A | * | 7/1966 | O'Neill ..................... | F02K 1/08 239/127.3 |
| 3,263,931 A | * | 8/1966 | Ranvier .................. | F02K 1/383 181/215 |
| 3,516,511 A | * | 6/1970 | Urquhart .................. | F02K 1/36 181/216 |
| 3,710,890 A | * | 1/1973 | True ......................... | F02K 1/36 181/215 |
| 3,737,005 A | * | 6/1973 | Tontini ..................... | F02K 1/36 181/216 |
| 3,739,984 A | * | 6/1973 | Tontini .................... | F02K 1/002 181/220 |
| 3,749,316 A | * | 7/1973 | Tontini ..................... | F02K 1/36 181/215 |

(Continued)

*Primary Examiner* — Gerald L Sung
*Assistant Examiner* — Alain Chau (57) ABSTRACT

An exhaust noise attenuation system with ultra thrust reverser system comprising double walled duct made of sheet metal with a perforated inner wall except in areas where there are solid non-perforated corrugations or hat sections which act as frames for structural integrity, with noise attenuation material, sandwiched between inner perforated and outer solid walls of duct. Double walled duct is bolted to engine aft turbine frame. Hinged Inlet Doors are mounted at forward end of duct, for ram recovery and control the flow of ambient air sucked by eductor action. A movable exit cone can be used to vary the exit area of double walled duct to optimize engine operation. Ultra hush thrust reverser system mounted at aft end of double walled duct, comprising two improved split flow clamshell doors mounted on top and bottom of double walled duct, with two unique design actuators mounted one on each side tucked between the external wall of duct and clamshell doors operating clamshell doors using linkages.

3 Claims, 4 Drawing Sheets

(56) References Cited

U.S. PATENT DOCUMENTS

| | | | | | |
|---|---|---|---|---|---|
| 3,927,522 | A | * | 12/1975 | Bryce | F02K 1/38 |
| | | | | | 181/215 |
| 4,379,191 | A | * | 4/1983 | Beggs | B32B 3/12 |
| | | | | | 181/292 |
| 4,836,469 | A | * | 6/1989 | Wagenfeld | B64D 33/04 |
| | | | | | 181/213 |
| 5,060,471 | A | * | 10/1991 | Torkelson | F02K 1/827 |
| | | | | | 181/213 |
| 5,154,052 | A | * | 10/1992 | Giffin, III | F02K 1/006 |
| | | | | | 239/265.13 |
| 5,269,139 | A | * | 12/1993 | Klees | F02K 1/383 |
| | | | | | 60/262 |
| 5,463,866 | A | * | 11/1995 | Klees | F02K 1/383 |
| | | | | | 239/265.17 |
| 5,592,813 | A | * | 1/1997 | Webb | B64D 33/06 |
| | | | | | 181/213 |
| 5,615,834 | A | * | 4/1997 | Osman | F02K 1/60 |
| | | | | | 239/265.19 |
| 5,884,472 | A | * | 3/1999 | Presz, Jr. | F02K 1/36 |
| | | | | | 239/265.17 |
| 5,884,843 | A | * | 3/1999 | Lidstone | F02K 1/34 |
| | | | | | 181/220 |
| 2004/0065502 | A1 | * | 4/2004 | Yamamoto | F02K 1/1223 |
| | | | | | 181/214 |
| 2008/0236167 | A1 | * | 10/2008 | Dussillols | F02K 1/383 |
| | | | | | 60/771 |
| 2010/0192715 | A1 | * | 8/2010 | Vauchel | F02K 1/763 |
| | | | | | 74/89.35 |
| 2011/0108357 | A1 | * | 5/2011 | Vauchel | F02K 1/827 |
| | | | | | 181/222 |

* cited by examiner

ULTRA HUSH EXHAUST SYSTEM (UHES)

FIELD OF INVENTION

This invention relates to what is known in the Aviation Industry as a hush system aiming at reducing the noise signature of jet engines like turbojets or low bypass jet engines.

This patent relates to the Application Document No. 61/626,878 Filed on Oct. 5, 2011.

BACKGROUND OF THE INVENTION

An ejector/eductor (those two words are used interchangeably) arrangement using a double walled duct mounted to the aft engine frame and method of reducing jet engine noise are disclosed wherein the primary combustion gas stream of the jet engine is ejected into a mixing section or zone of the double walled duct, into which a secondary external cool gas stream from ambient air is injected at a velocity sufficient to create a mixed flow condition, resulting in rapid mixing of the primary and secondary gas streams both in the mixing zone. The ejector, can be provided with means for adjusting the exit area of the mixing section or zone to match the engine operating conditions so as to create proper conditions within the mixing zone for noise suppression. Noise suppression by the method and means disclosed occurs at all frequencies with probably a minimal loss of thrust, and possibly a slight gain in thrust due to mass flow increase from the inducted ambient air which can increase the overall momentum of the exhaust gases.

The ultra hush exhaust system (uhes) is an ejector/eductor hush kit for airliners and general aviation business jets powered by what is referred to as low by-pass jet engines or turbojet engines which generate a very loud acoustic signature. This high acoustic signature results in noise pollution at airports and undesirable noise during approach, take-off or flying at low altitude over residential areas located near the approach path of airports. The ultra hush exhaust system is invented to retrofit the current exhaust system of these aircrafts or future supersonic aircrafts with the ultra hush exhaust system (uhes) to comply with strict airworthiness noise regulations which are not met by these types of aircrafts, thereby extending their service life.

The uhes ejector hush exhaust system adapts the ultra and/or square thrust reverser system, U.S. Pat. Nos. 5,615,834 and 7,043,897, with improvements to the clamshell doors to mitigate the effect of rudder blanking, and the actuation system. The reverser/eductor system decelerates the aircraft after landing and reduces the jet engine noise to acceptable noise levels during take-off and approach for landing to meet stricter airworthiness noise regulations. This in turn will extend the service life of this type of aircrafts instead of having to replace their engines with new quieter engines or disposing of the aircraft all together since it violates the noise regulations, which constitutes a major financial loss to the owner.

The uhes ejector design concept is based on SAE Aerospace Information Report AIR-1191 and method of calculation of the primary exhaust gas flow and secondary cold flow drawn from ambient air. Ejectors are used extensively in various aerospace applications for providing cooling air to various compartments in engines and aircraft systems. Ejectors, also referred to also as eductors, principle of operation relies on the high speed engine exhaust gases exiting the engine exit nozzle, with relatively lower static pressure than ambient surrounding air, entering a mixing duct entraining with it the ambient air which is at a higher static pressure which rushes towards the area of lower static pressure, thereby causing the ambient air to mix with the high speed exhaust gases, thereby reducing the exhaust gas's velocity and noise signature which is caused by the shear forces between static ambient air and the high speed exhaust gases, at or near sonic velocity at the exit plane from the Jet Engine.

Previous designs for ejector hush systems such as U.S. Pat. No. 3,820,630 shows an ejector nozzle noise suppressor for a jet engine exhaust is provided by an annular divergent body attached to an exhaust nozzle. The smallest diameter of the divergent body is larger than the diameter of the exhaust nozzle's exit to form an annular step which produces a shock wave in the exhaust as it passes the step. An annular shroud is disposed around the divergent body and causes outside air to pass through voids in the divergent body to mix with the jet exhaust gas. The divergent body includes a plurality of channels with separators between the channels.

U.S. Pat. No. 7,111,448 describes a jet nozzle mixer includes identically formed lobes mounted inside the original tailpipe installation to provide mixing. The mixer works to mix the engine internal bypass flow with the internal jet engine core flow to level the disparate flow velocities, to reduce the peak velocities from the jet engine core and increase the lower bypass velocities of the engine internal bypass flow, and thereby reduce noise. No external air is inducted into the mixing tailpipe. The internal lobe contours act as lifting flutes, causing mixing of the primary hot and cold flows to mix before exiting the nozzle. External lobe contours at the engine exit plane act as venturi chutes, accelerating the cooler ambient secondary air flow. The external lobes thus act collectively as an injector to force the cooler ambient secondary flow into the previously mixed primary flow as it exits the nozzle.

U.S. Pat. No. 3,710,890 describes an exhaust nozzle noise suppression system for turbojet engines based on a centerbody plug mounted to the engine. The exhaust flow from the engine is directed by the centerbody plug into the ejector airstream from ambient air. A duct shrouds the eductor system which is mounted to the centerbody plug using struts.

In combination, each of the components of the hush kit described herein reduces noise generated by the jet engine for compliance with Federal Aviation Administration noise reduction requirements.

SUMMARY OF THE INVENTION

The subject disclosure presents an innovative patent for an aircraft system exhaust system adapting the ultra and/or square thrust reverser system, U.S. Pat. Nos. 5,615,834 and 7,043,897 features to a reverser/eductor system mounted to the engine, to reduce the jet engine noise to acceptable noise limits to meet current airworthiness noise regulations for older aircrafts powered by turbojet and low bypass jet engines and future supersonic aircrafts.

It is a primary object of this invention to provide a method of reducing jet engine noise at all frequencies with minimal loss of thrust, and possibly some gain in thrust, by employing an ejector assembly having a mixing zone into which a secondary air stream is injected at a relatively higher static pressure.

It is a further object of this invention to provide an ejector assembly and method wherein the velocity of secondary stream injected into the mixing zone of the ejector for mixing with the primary combustion exhaust gas stream from the jet engine is sufficiently high to result in rapid mixing of the primary and secondary gas and air streams in the mixing zone and reaches a choked condition at the exit end mixing zone in the duct.

The ejector assembly for the convergent double walled duct configuration; can be provided with a means for adjusting the area of the mixing section to match jet engine operating conditions.

The forward end of the eductor duct is mounted to the engine turbine flange through mounting struts connecting the eductor double walled duct to the engine exit turbine flange through a nozzle/ring. While at the aft end of the eductor is mounted an ultra or square thrust reverser. The ultra or square thrust reverser, referred to collectively in the text as the ultra thrust reverser, consists primarily of an upper and lower improved design clamshell door mounted on top of the eductor duct exterior skin.

The improved design clamshell doors are either semi-circular or square/rectangular/trapezoidal shape similar in concept to the aforementioned ultra reverser U.S. Pat. Nos. 5,615,834 and/or 7,043,897. The clamshell doors consist of an inner and outer skins mechanically connected at the edges. Two major innovative improvements are made to the doors. The First improvement to the design of the clamshell doors where the inner skin is fitted with guide vanes to direct the cool eductor air towards the middle of the door to blanket the inner skin with the cool air and to mix this cool air with the hot gases from the engine exhaust to reduce the overall gas temperature to enable the use of lower temperature material in the design of the clamshell doors. The Second improvement to the clamshell doors inner skin is by making a slot or more upstream of the inner skin to allow the reversed flow flowing along the door in the reverse thrust deploy mode to split into two flow components, one flowing towards the kicker plate then forward to produce the desired reverse thrust, while the second component of the split flow of the reversed flow flows between the inner and outer skin exiting through slots in the kicker plate of the inner skin, forward producing a forward component pushing the first flow component downward and forward instead of flowing upward, thereby maximizing reverse thrust efficiency by reducing reverse thrust flow angle and help mitigate rudder blanking effect to improve the aircraft directional control.

The innovative actuator design is an actuator within the actuator referred to as actuator-in-actuator (aia), where one of the actuators is used to deploy and stow the clamshell doors while the other smaller inner actuator simultaneously drives fore and aft the movable fairing during each stow or deploy operation for the clamshell doors and movable fairings. The two actuators-in-actuator, on each side of the outer skin of the double walled duct, are housed in a depression/blister one on each side of the eductor exterior wall in between the clamshell doors and the external surface of the double walled eductor duct to provide a smooth exterior surface with no protrusions and are bolted to a frame on the eductor duct. The actuators are used to deploy the clamshell doors aft of the eductor duct exit plane, using pivoted linkages connecting the actuators to the doors and to drive aft and fore the movable fairing during deploy and stow operations of the ultra reverser. The deployed doors divert the exhaust gases forward causing reverse thrust action for deceleration on the ground or during an aborted take-off of the aircraft or simply for braking during taxiing operation on the ground.

The ultra hush exhaust system (uhes) is invented to retrofit the current exhaust system on turbojet and low bypass aircrafts engines to meet the airworthiness noise regulations.

BRIEF DESCRIPTION OF THE DRAWINGS

A better understanding of the present invention can be obtained from the detailed description of exemplary embodiments set forth below to be considered in conjunction with the attached drawings, in which.

DETAILED DESCRIPTION OF THE PREFERRED EMBODIMENT

Figures 1, 2, 3:
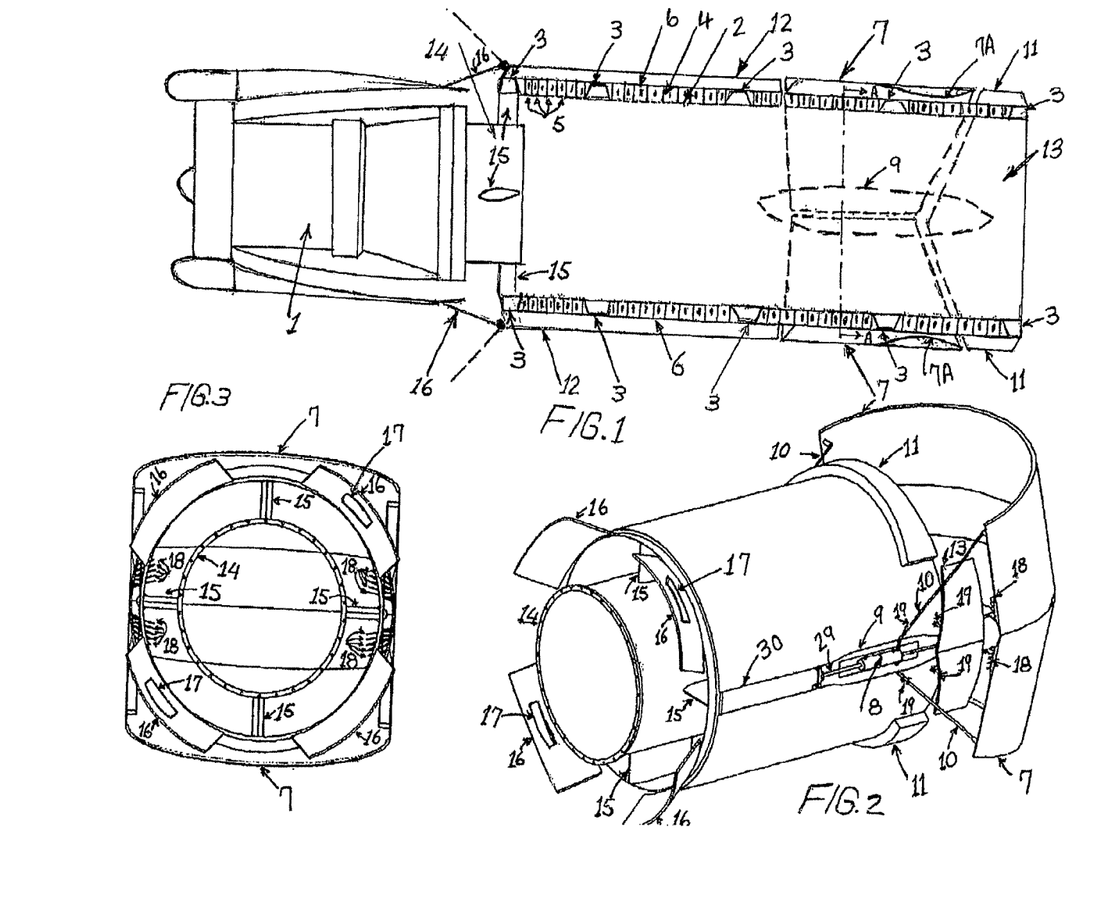
FIGS. 1, 2 and 3 represent respectively a cutaway of the engine and the uhes shown mounted to the aft turbine frame with the ultra reverser in the stow position, an isometric view of the uhes with the ultra reverser in the deploy position and a forward looking aft view of the uhes with the ultra reverser clamshell doors deployed.
Figure 4:
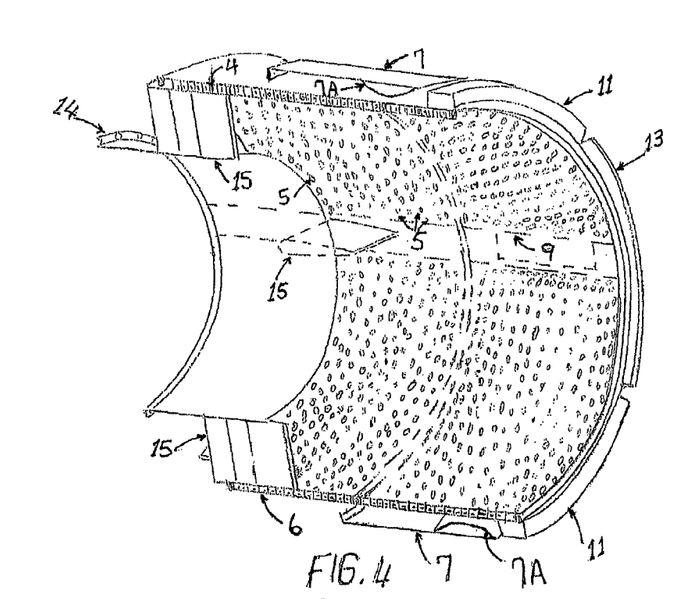
FIGS. 4, 5 and 6 represent respectively a half-section of the uhes showing the perforated inner skin, the attachment nozzle/ring to the engine turbine frame, the sound attenuating honeycomb lining between the perforated inner skin and the outer skin, the ultra reverser upper and lower doors halves, the struts and frames and the fixed fairing in the stow position, a cross-section A-A in the blister area showing the perforated inner skin which is prior art, the sound attenuation honeycomb material and the outer skin, and an isometric cutaway of the hydraulic actuator in actuator design.
Figure 5:
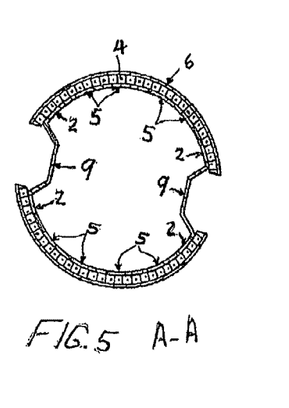
Figure 10:
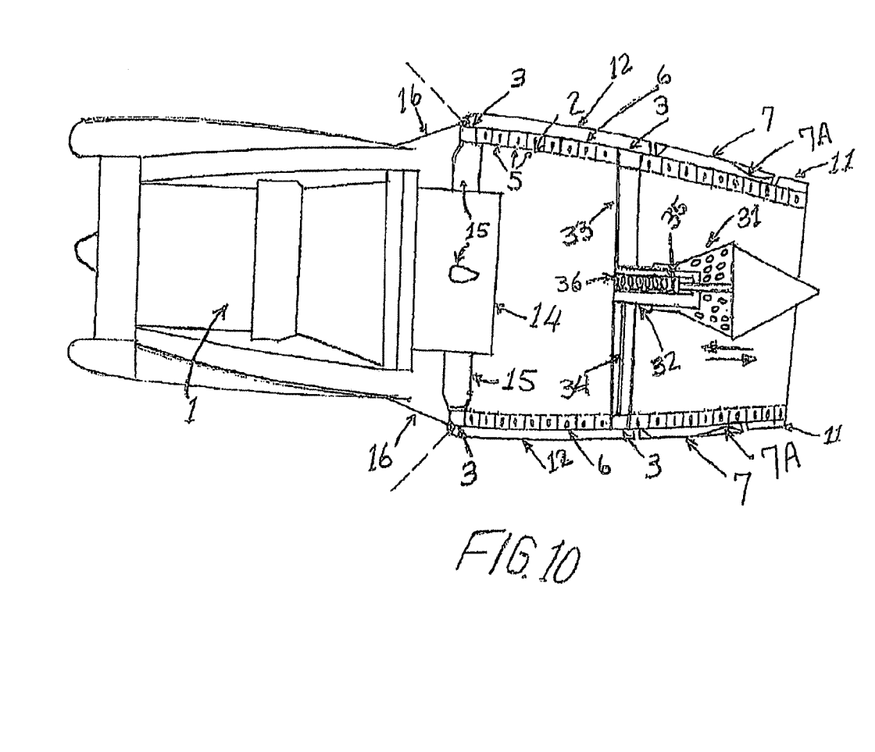
FIG. 10 shows a cross-section of an alternate configuration convergent uhes instead of the constant area duct configuration, with a conic movable device in its center which can be used to control the exit area to optimize the turbine engine performance.

The design concept included in preferred embodiments in FIG. 1 is for a sound attenuation system referred to as the uhes which is mounted to the rearmost aft turbine frame of a jet engine 1. The uhes comprises an integrally constructed double walled duct illustrated in FIG. 1 with a constant cross-section area or can be a convergent duct as shown in FIG. 10. the uhes duct consists of an inner skin 2 integrally constructed with circular corrugations 3, referred to also as frames, ribs or hats or ridges, which act as supporting frames, with the areas in between those frames in the inner skin are perforated where sound attenuation material 4, which can be honeycomb or any other appropriate acoustic treatment material are located on top of the perforations 5. The outer skin 6 is continuous with no perforations and is appropriately fastened or welded to the ribs 3 of the inner skin 2.

Figure 8:
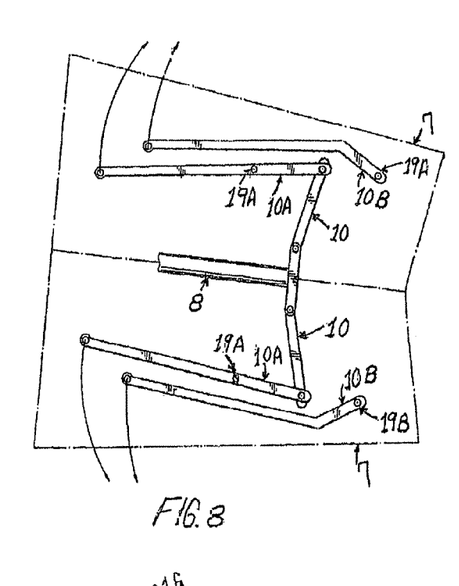
Figure 9:
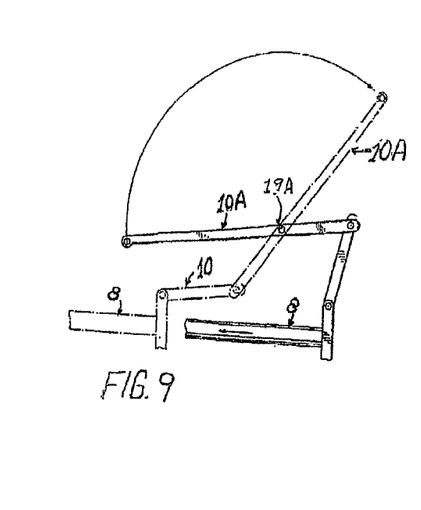

At the rear end of the integrally constructed double walled duct, two semi-circular or square shaped clamshell doors 7 are located on top and bottom of the duct which are stowed during forward flight and deployed, as shown in FIG. 2, on the ground behind the duct to divert the engine exhaust flow and eductor air flow forward to decelerate the aircraft. The clamshell doors 7 are operated by two actuators 8 located on each side of the duct in an internal depression 9, which drive four (4) mechanical linkages 10, 10A, 10B as shown in FIGS. 8 and 9, assuming the actuators are hydraulic for the sake of discussion but the working fluid can be any appropriate fluid or gas available on the aircraft. Behind each clamshell door 7, there is a fixed fairing 11, and forward of the door there can be a fixed fairing 12 also to stream line the air flow over the double walled duct. On each side of duct, the clamshell doors 7, there are two (2) movable fairings 13, connected to actuators 8, one each side of the duct, which move aft during deployment of the thrust reverser on the ground. The movable fairings 13 along with the clamshell doors 7 do contain the exhaust flow from the engine and the eductor during reverse thrust mode, act as plume arrestors to prevent any leakage of the exhaust gases resulting in impingement of the exhaust gases on the fuselage of the aircraft and reduction of reverse flow efficiency.

At the front end of the integrally constructed double walled duct, there is a nozzle/ring 14 which is mounted to the engine turbine frame of the core exhaust flow through bolts in flanges or any other appropriate attachment method. The nozzle/ring can be manufactured using the same approach of the eductor duct, in two walls where the inner one is perforated and the outer is solid enclosing honeycomb or any appropriate sound attenuation material. The nozzle/ring can also be constructed with perforations at the exit plane to allow the cooler air to flow through and mix with the exhaust gases The exit plane of the ring 14 can be fitted with any of the methods used to mix the core engine hot gases with the cooler gases from the low by-pass fan or the eductor ambient air such as a mixer, chevrons or flutes which are currently common in the industry (not shown) to improve noise attenuation of the hot exhaust gases with the cool eductor ambient air. The nozzle/ring 14; supports the double walled acoustically treated duct through four (4) struts 15, in the illustrations for depiction. The struts 15; can have internal passages to allow some hot exhaust gases to flow through to keep them warm to prevent ice accumulation during flight in icing conditions. Four (4) hinged inlet doors 16 are mounted to the front end of the double walled duct which are open during take-off and approach flying modes to enhance ram recovery of ambient air beyond the external flow boundary layer to improve aspiration by the eductor action into the acoustically treated duct, to mix with the higher speed hot engine exhaust gases, to reduce their noise due to the shear action between the higher velocity exhaust gases and the lower velocity ambient air. The double walled acoustically treated eductor duct will hush the engine noise. The inlet doors 16 can be also fitted with an opening 17 to allow cool ambient air to flow through along the inner wall 2 of the integrally constructed acoustically treated double wall duct to keep it cool and protected from the hot engine exhaust gases when the hinged inlet doors 16 are closed during cruise to reduce ram drag and to streamline the airflow along the surface of the engine and double walled duct.

The thrust reverser doors inner skin 7A, are fitted with guide vanes 18, which are used to direct the cooler ambient air or low by-pass cooler air from the engine to mix with the hot engine exhaust gas to cool the thrust reverser inner skin 7A during thrust reverser operation mode on the ground. This can also allow the use of material with lower melting temperature such as aluminum instead of other heavier materials with higher melting temperature such as Nickel based alloys or Steel.

Figure 11:
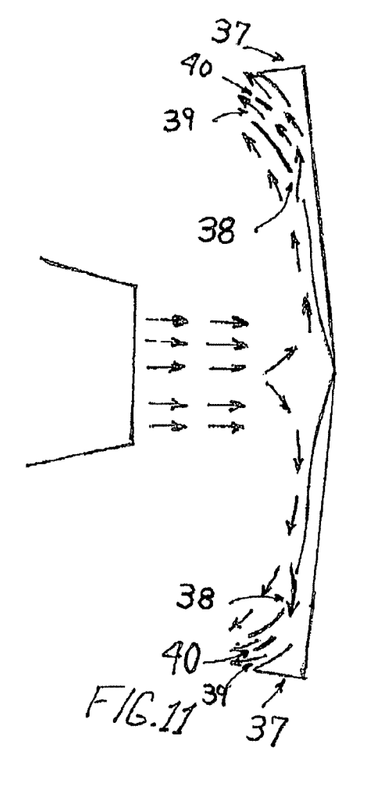
FIG. 11 shows a cross-section of the split flow doors in the reverse thrust deploy position showing the reverse flow arrows flowing along the inner skin and splitting into two flows, one flowing towards the kicker plate while the other flows between the inner and outer skin exiting through slots in the kicker plate.

The thrust reverser inner skin 7A is modified where the inner skin has a slot 38 or more upstream of the inner skin to allow the reversed flow flowing along the door in the reverse thrust deploy mode to split into two flow components, the first flow flowing towards the kicker plate 37 then forward to produce the desired reverse thrust, while the second flow component of the split flow of the reversed flow, flows between the inner and outer skin through slot 38 exiting through slots 39 in the kicker plate of the inner skin which can be fitted with guide vanes 40, directing the split flow forward producing a forward component pushing the first flow component downward and forward instead of flowing upward, thereby maximizing reverse thrust efficiency and mitigating the rudder blanking effect.

Each thrust reverser door 7 are operated by Six (6) links 10, 10A, 10B on each side of the thrust reverser doors, where the links pivot around fixed pivoting points 19A and 19B on the outer skin 6 of the acoustically treated duct. The forward links 10A are pivoted at 19A and are driven by the actuator 8 as shown in FIGS. 8 and 9 which show the stow and deploy positions of the thrust reverser doors during forward flight and reverse thrust mode on the ground.

Figure 6:
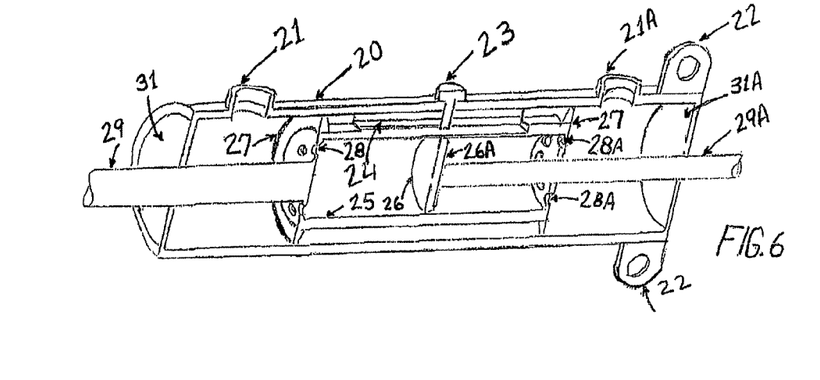
Figure 7:
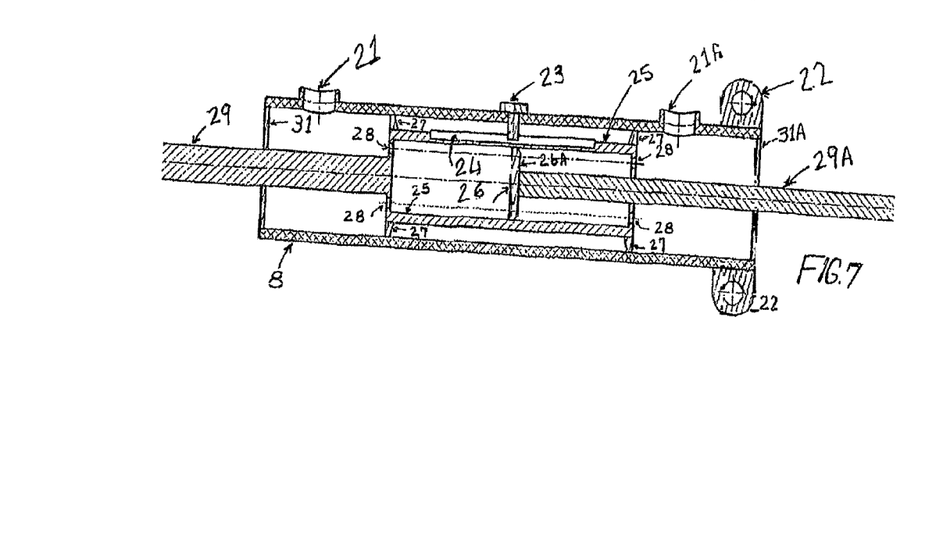
FIGS. 7, 8 and 9 show respectively a cross-section of the actuator-in-actuator design, the ultra reverser operating linkages kinematics in stow position and the operating linkages in the deploy position which are also prior arts.

The actuator-in-actuator (aia) design 8 consists of two concentric cylinders as shown in the cross-section views in FIGS. 6 and 7. The outer cylinder has two ports 21 and 21A for the hydraulic fluid entry and return to the hydraulic system during thrust reverser operation. Two lugs 22 attached to the outer cylinder 21, which in turn are connected to the forward links 10 and 10A, of the upper and lower thrust reverser doors 7. The outer cylinder is fitted with a pin 23, or more pins if required by design, which fits inside a groove 24 in the outer wall of the inner cylinder 25 to prevent rotation of the outer cylinder. The inner cylinder 25 houses a piston 26 which is connected to the movable fairing 13 through rod 29A. At both ends of the inner cylinder 25, there are two (2) rings 27 which support the outer cylinder 21. The two circular covers at both ends of the inner cylinder 25, have orifices 28 and 28A to allow the hydraulic fluid, to enter and exit the inner cylinder 25 during thrust reverser operation. A rod 29 is concentric to the actuator and is an integral part of the forward circular cover 27 of the inner cylinder 25, which passes through some sealing in the cover 31 of the outer cylinder 20 to prevent the hydraulic fluid from leaking. The rod 29 of each actuator 8, is bolted to one of the acoustic duct frames 3 and the longitudinal beam 30, on both sides of the acoustically treated duct. Rod 29A which is connected to the piston 26 is bolted to the movable fairing 13 and also goes through some sealing in the cover 31A to prevent leakage of the hydraulic fluid.

During thrust reverser deployment operation on the ground, the hydraulic fluid under pressure enters through orifice 21 to fill the forward chamber of the hydraulic actuator 8, exerting hydraulic pressure pushing against the cover 31 of the outer cylinder 20 causing it to move forward under pressure along the rod 29 and cover 31A will move along rod 29A. The hydraulic fluid flows also through orifices 28 into the inner cylinder 25 exerting hydraulic pressure against the piston 26 which is connected to the movable fairing 13 through rod 29A causing the movable fairing 13 to move aft to close the gap between the thrust reverser clamshell doors and the duct to assure that all reverse flow gases and plumes are enclosed acting as a plume arrestor, and not impinging on the aircraft fuselage but directed forward to cause the desired aircraft deceleration. The movement forward of the outer cylinder 20 causes the lugs 22 which are connected to the links 10, to move forward as well causing the links 10A to rotate around pivoting point 19A to deploy the thrust reverser doors as shown in FIG. 8. The hydraulic fluid in the back side of piston 26A will be forced into the aft chamber of the actuator 8, which in turn due to the forward motion of the outer cylinder 20 and the ensuing decrease in volume of the aft chamber, will force the hydraulic fluid to flow through orifice 21A into the return line of the hydraulic system of the aircraft.

During the thrust reverser stow operation, the reverse operation will occur, the hydraulic fluid under pressure will enter through orifice 21A filling the aft chamber of the hydraulic actuator 8, exerting hydraulic pressure pushing against the cover 31A of the outer cylinder 20 causing it to move aft along the rod 29A and cover 31 will move along Rod 29.

The hydraulic fluid flows also through orifices 28A in the inner cylinder 25 exerting hydraulic pressure against the piston back face 26A which is connected to the movable fairing 13 causing the movable fairing 13 to move forward to rest against the thrust reverser doors 7 in the forward thrust position as shown in FIG. 1. The movement aft of the outer cylinder 20 causes the lugs 22 which are connected to the links 10 and 10A, to move aft as well, causing the links 10, 10A, 10B to stow the thrust reverser doors as shown in FIG. 8. The hydraulic fluid in the back side of piston 26 will be forced into the forward chamber of the actuator 8, which in turn due to the aft motion of the outer cylinder 20 and the ensuing decrease in volume of the forward chamber, will force the hydraulic fluid to flow through orifice 21 into the return line of the hydraulic system of the aircraft.

Pin 23 moves inside groove 24 to prevent any twisting relative motion between the outer cylinder 20 and inner cylinder 25, thereby assuring proper operation in the linear direction without any rotation of the outer cylinder 20 around the fixed inner cylinder 25, thereby assuring that the actuator is not subjecting the thrust reverser linkages 10, 10A, 10B and pivoting point 19A, 19B and duct components to any additional stresses.

In the convergent uhes duct configuration shown in FIG. 10, a conic body 31 made up of two cones, can be mounted to an actuator cylinder 32, assuming hydraulic working fluid but it can use any other type of working fluid, which is mounted to one or multiple diametric supports 33. A hydraulic line 34 mounted inside the hollow support 33, brings the hydraulic fluid under pressure, inside the cylinder 32, exerting a force on the piston 35 which is attached to a tension spring 36, forcing the cone 31 to move aft, thereby reducing the size of the exit area to optimize the engine performance during cruise condition. When the aircraft hydraulic return valve (airframe part not shown) is open, the hydraulic fluid is drained into the aircraft hydraulic system, thereby reducing the force on the piston 35, enabling the tension spring 36 to pull the piston 35 forward pulling with it the cone 31, to increase the exit area for the exhaust gases to exit the aft section of the convergent uhes duct.

The forward cone can be designed as a solid cone or as a double walled cone with acoustic attenuation material sandwiched between the inner wall and the outer perforated wall to contribute to the overall engine noise reduction.

The foregoing disclosure and description of the invention are illustrative and explanatory thereof; and various changes in the size, shape and materials, as well as in the details of the illustrated system may be made without departing from the spirit of the invention.

What is claimed is:

1. An Ultra hush exhaust system (UHES) for jet engine noise attenuation on a jet engine having an exhaust nozzle/ring assembly for discharging engine exhaust gases, the UHES comprising:
    a double walled duct of constant or convergent cross-sectional area from a forward end to an aft end, configured to receive the engine exhaust gases and eductor air at the forward end of the double walled duct, wherein the double walled duct includes a solid outer wall and an inner wall that is perforated, said inner wall comprising a plurality of axially spaced corrugations/ribs, each of the corrugations/ribs extending annularly about the inner wall to form a supporting frame for the doubled walled duct, wherein the inner wall is perforated only in areas that are axially between each of the axially spaced corrugations/ribs, the double walled duct further comprising noise attenuation material disposed between the outer wall and the inner wall;
    wherein the forward end of the double walled duct is mounted to the exhaust nozzle/ring assembly with a plurality of radially extending struts, thereby forming an annular passage radially between the nozzle/ring assembly and the forward end of the double walled duct for receiving the flow of eductor air, said nozzle/ring assembly bolted to a downstream end of an aft turbine frame of the jet engine; and
    a plurality of inlet doors installed at the forward end of double walled duct, wherein the plurality of inlet doors are configured to open during takeoff and approach modes of the jet engine to act as ram scoops for ambient free stream air recovery into the double walled duct to improve eductor performance, wherein the plurality of inlet doors are closed during cruise mode of the jet engine to reduce drag, and wherein each inlet door of the plurality of inlet doors further comprises an opening formed thereon, said opening configured to permit entry of ambient free stream air to flow along the inner wall of the double walled duct when the plurality of inlet doors are closed.

2. The UHES of claim 1, further comprising a thrust reverser comprising:
    clamshell doors coupled to the aft end of the double walled duct and operated by actuators to move between a stowed position and a deployed position that diverts the engine exhaust gases and eductor air in a forward direction,
    said clamshell doors including first guide vanes attached to an inner skin of the clamshell doors, said first guide vanes configured to direct ambient or bypass airflow to mix with the engine exhaust gases to cool the thrust reverser when the clamshell doors are in the deployed position;
    said inner skin comprising a slot configured to split the engine exhaust gas flow and eductor air flow along the clamshell doors into two flows, when the clamshell doors are in the deployed position; the two flows comprising: a first flow external along the clamshell doors, and a second flow in between an outer skin and the inner skin of the clamshell doors exiting through second guide vanes disposed in the inner skin, the second guide vanes configured to direct the second flow in the forward direction when the clamshell doors are in the deployed position; and
    moveable fairings coupled to the actuators and positioned on each side of the double walled duct near the clamshell doors, said moveable fairings configured to move axially aft when the clamshell doors are moved to the deployed position to enclose the flow of engine exhaust gases and eductor air when the clamshell doors are in the deployed position, to prevent leakage of the engine exhaust gases and eductor air.

3. The UHES of claim 2, wherein the actuators of the thrust reverser each comprise an actuator-in-actuator (AIA)

mechanism coupled to the clamshell doors and moveable fairings, wherein each AIA mechanism comprises an outer cylinder concentric with an inner cylinder, and a piston contained within the inner cylinder; said outer cylinder coupled to the clamshell doors via forward linkages; and said piston coupled to the moveable fairings through a rod; wherein the AIA mechanism is configured to simultaneously extend the outer cylinder in a first direction and the piston in a second direction that is opposite the first direction during deployment of the clamshell doors and movable fairings.

* * * * *